(12) United States Patent
Albertson

(10) Patent No.: US 7,243,802 B2
(45) Date of Patent: Jul. 17, 2007

(54) INLET STRUCTURE FOR CLARIFIERS

(75) Inventor: Orris E. Albertson, LaBarge, WY (US)

(73) Assignee: Enviro Enterprises, Inc., LaBarge, WY (US)

( * ) Notice: Subject to any disclaimer, the term of this patent is extended or adjusted under 35 U.S.C. 154(b) by 108 days.

(21) Appl. No.: 10/844,697

(22) Filed: May 13, 2004

(65) Prior Publication Data

US 2005/0252868 A1   Nov. 17, 2005

(51) Int. Cl.
*B01D 21/24* (2006.01)
(52) U.S. Cl. ......................... 210/519; 210/528
(58) Field of Classification Search ............... 210/519, 210/528, 532.1
See application file for complete search history.

(56) References Cited

U.S. PATENT DOCUMENTS

| | | | |
|---|---|---|---|
| 2,635,757 A | 4/1953 | Walker | |
| 3,216,570 A * | 11/1965 | Cunetta | 210/528 |
| 3,539,051 A * | 11/1970 | Stone | 210/528 |
| 3,770,131 A * | 11/1973 | Davis et al. | 210/519 |
| 3,926,805 A * | 12/1975 | Walker | 210/519 |
| 5,186,821 A * | 2/1993 | Murphy | 210/519 |
| 5,944,995 A * | 8/1999 | Sethi et al. | 210/532.1 |
| 6,099,743 A * | 8/2000 | Pedersen | 210/519 |
| 6,276,537 B1 | 8/2001 | Esler et al. | |
| 2003/0136730 A1* | 7/2003 | Schneider et al. | 210/519 |
| 2004/0020847 A1 | 2/2004 | Wright | |

* cited by examiner

*Primary Examiner*—Christopher Upton
(74) *Attorney, Agent, or Firm*—Blackwell Sanders Peper Martin LLP

(57) ABSTRACT

A clarifier is provided with an improved inlet structure which receives influent from influent column ports and discharges the influent uniformly around the entire circumference of the inlet structure. The influent column ports may be baffled. Angled guide vanes on the inlet structure reduce the flow energy and effect a tangential flow into a feedwell in the basin. The feedwell may be conical to further reduce the velocities and create an outward flow to counteract inward flows in the basin.

15 Claims, 3 Drawing Sheets

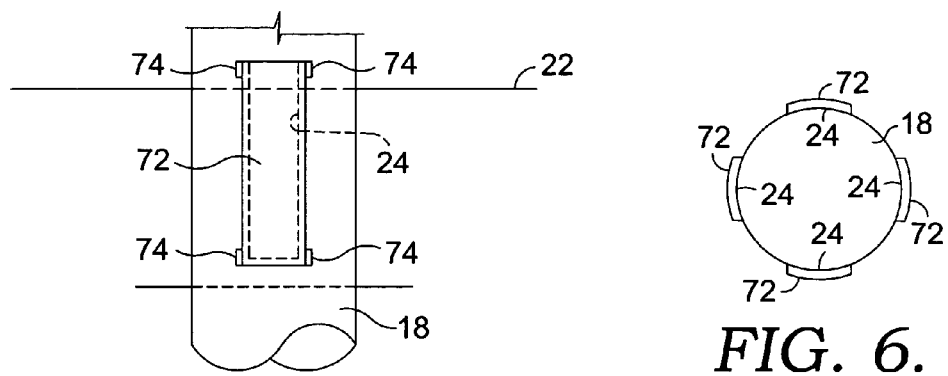
FIG. 5.
FIG. 6.
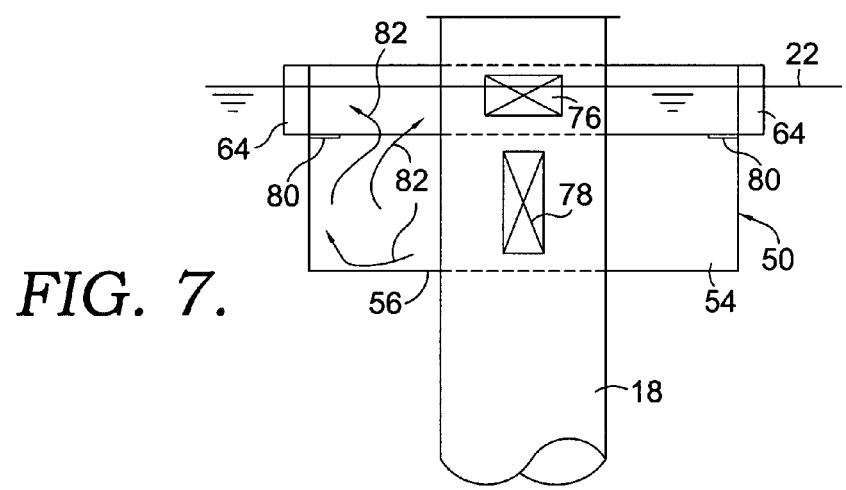
FIG. 7.
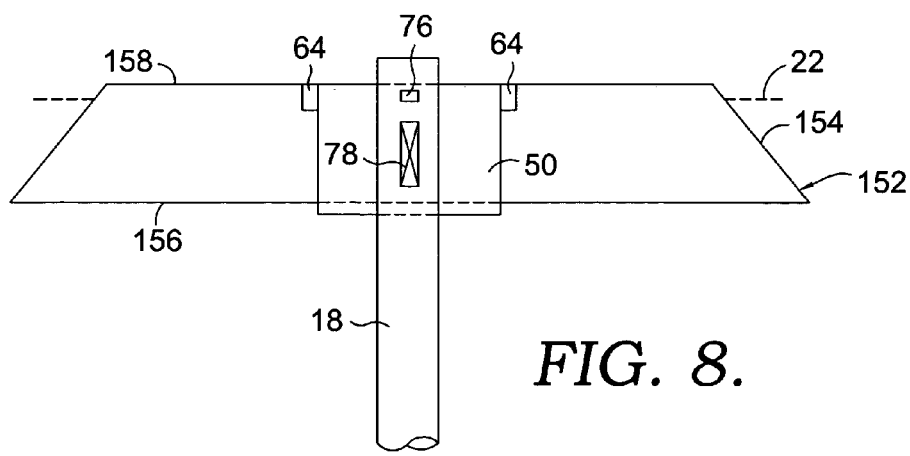
FIG. 8.

INLET STRUCTURE FOR CLARIFIERS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates generally to the clarification of liquids and more particularly to an improved inlet structure for controlling the flow characteristics of influent entering a clarification basin.

BACKGROUND OF THE INVENTION

Clarifiers of various sizes and types are commonly used in applications requiring the settling of solids from an influent liquid, such as in the treatment of water and wastewater. The influent is usually introduced into the clarifier from an influent column which extends in the center of the clarifier and has ports that discharge the influent from the column. Clarifiers are normally equipped with feedwells that take the form of rings extending around the influent column near the top of the clarifier basin.

There are a number of flow characteristics of the influent that have been recognized as being problematic. First, the influent discharges from the center column at relatively high energy levels that must be dissipated to reduce the influent velocity so that the flow into the clarification zone is uniform. In the past, inlets such as shown in U.S. Pat. No. 2,635,757 have been used to direct the flow tangentially into the feedwell and also with a radially outward component. In time, it was discovered that non-uniform radial flow was undesirable because it tends to maintain a circulation pattern that is detrimental to settling.

More recently, other types of inlet structures have been proposed. One that has been largely successful makes use of an inlet structure that extends around the influent column and is constructed to achieve tangential flow into the feedwell through outlets equipped with scoops. Another inlet structure has used box-type baffles to discharge the influent horizontally in each direction. U.S. Pat. No. 6,276,537 provides a bottom discharge into tees that direct the flow in opposite directions. Recent patent publication No. 2004-002847-A1 is directed to an arrangement that intermixes the influent using directional baffles.

While all of these approaches to dissipating the inlet energy are improvements over simple ports in the influent column, they all have drawbacks. One common problem is that the influent enters the feedwell in a number of separate or discrete flow streams that are at relatively high velocities and energy levels. These separate flow streams cause turbulence, and they tend to maintain their separate identities in the clarifier zone, thereby reducing the efficiency and the clarifier capacity. Another problem is that when the influent column ports are aligned with the scoops of the inlet structure, imbalances in the flow occur and relatively high velocities result at the locations of the alignments. Such flow imbalances and non-uniformities in the flow detract from the performance of the clarifier to a significant extent.

The depth of the feedwell is known to have a significant effect on clarifier performance. The liquid must pass beneath the lower edge of the feedwell in order to enter the clarification zone. The deeper the feedwell is, the less distance there is between its lower edge and the basin floor. A small clearance between the feedwell and clarifier floor is undesirable because it results in a higher flow velocity which reduces the hydraulic detention. The built up sludge on the floor can be disrupted by high velocity flow into the clarifier from the feedwell. Thus, a shallow feedwell is recognized as being advantageous to clarifier performance.

As a practical matter, the feedwell depth should ideally be no more than about 45% of the depth of the clarifier wall in order to achieve good hydraulic detention and avoid scouring of the sludge blanket on the clarifier floor. However, there are many existing basins that are shallow and others that must be shallow because of site conditions or other factors. Therefore, it is often not possible under currently prevailing design practices to reduce the feedwell depth to less than 50% of the sidewall depth.

The main reason is that the feedwell must extend below the bottom of the discharge from the inlet structure far enough to provide sufficient clearance that the influent flow cannot short circuit directly under the feedwell. The clearance between the bottom of the discharge from the inlet structure and the bottom of the feedwell should be at least three feet if short circuiting of the influent is to be avoided. In order to produce acceptable flow velocities into the feedwell, the ports must have a relatively long height dimension so that their combined area is large and yet they are still far enough apart that the center column structure has sufficient strength to withstand the forces to which it is subjected. As a result, the discharge outlets from the inlet structure are typically about two to three feet deep at their lower edges, resulting in the feedwell being about five to six feet deep at its lower edge. In shallow clarifiers, the clearance between the feedwell and the clarifier floor is insufficient to achieve good clarifier performance under these conditions.

SUMMARY OF THE INVENTION

The present invention is directed to an improved inlet structure for clarifiers and has, as its primary goal, the provision of an inlet configuration that cooperates with associated clarifier components in a manner to improve the clarifier efficiency and performance.

In accordance with the invention, the clarifier performance is enhanced by increasing its volumetric utilization (retention characteristics), limiting the higher energy vectors that can cause short circuiting and solids losses, and increasing the chemical and biological flocculation to increase settling rates and solids removal.

Improvements in the clarifier performance in all of these respects are achieved by a special construction of the inlet structure and its arrangement relative to other components in a novel manner that (1) eliminates the disturbing effects of separate flows jetting into the feedwell, (2) produces uniform flow into the feedwell around a full 360° circumference, (3) achieves controlled tangential flow to promote flocculation in the feedwell, (4) minimizes the depth of the inlet discharge into the feedwell so the feedwell can have a shallow position in the clarifier to avoid scouring of the sludge blanket on the clarifier floor, (5) creates a tapered velocity profile for the flow that enters the clarification zone, and (6) increases the retention efficiency of the clarifier through the use of tangential discharge from the feedwell.

In accordance with a preferred embodiment of the invention, a specially constructed inlet is provided around the center influent column inside of the feedwell. The inlet structure differs from conventional practice in that substantially its entire circumference is used to discharge the influent flow into the feedwell over the top of the inlet structure. The over-the-top discharge from the inlet structure is preferably guided by a series of vanes which may be angled to effect tangential flow into the feedwell. The flow out of the influent column is preferably baffled by deflectors or by the wall of the inlet structure.

By baffling the center column ports and using the entire circumference of the inlet as a discharge channel, the energy level of the flow is reduced significantly in two different steps or stages, and the tangential flow that results is beneficial to the performance of the clarifier. A third stage of energy reduction can be provided in the feedwell by flaring the feedwall to increase its area from top to bottom.

An optional feature of the invention involves providing two different sets of ports in the influent column. A lower set of ports may be located below the level of the discharge from the inlet and may be relatively large so that the great majority of the flow is baffled by the inlet wall. Another set of upper ports may be located at or near the surface and are much smaller collectively than the lower ports so that there is no significant disruption of the overflow from the inlet structure.

Other and further objects of the invention, together with the features of novelty appurtenant thereto, will appear in the course of the following description.

BRIEF DESCRIPTION OF THE SEVERAL VIEWS OF THE DRAWINGS

In the accompanying drawings which form a part of the specification and are to be read in conjunction therewith and in which like reference numerals are used to indicate like parts in the various views:

FIG. 5 is a fragmentary elevational view on an enlarged scale showing baffles applied to the ports in the influent column in accordance with one aspect of the invention;

FIG. 6 is a top plan view of the influent column with baffles attached;

FIG. 7 is a fragmentary elevational view diagrammatically showing an inlet structure constructed according to a preferred embodiment of the invention, with upper and lower ports shown in the influent column in accordance with an optional aspect of the invention; and FIG. 8 is a diagrammatic elevational view of an inlet structure constructed according to one embodiment of the invention in combination with a frusto-conical feedwell.

DETAILED DESCRIPTION OF THE INVENTION

Figure 1:
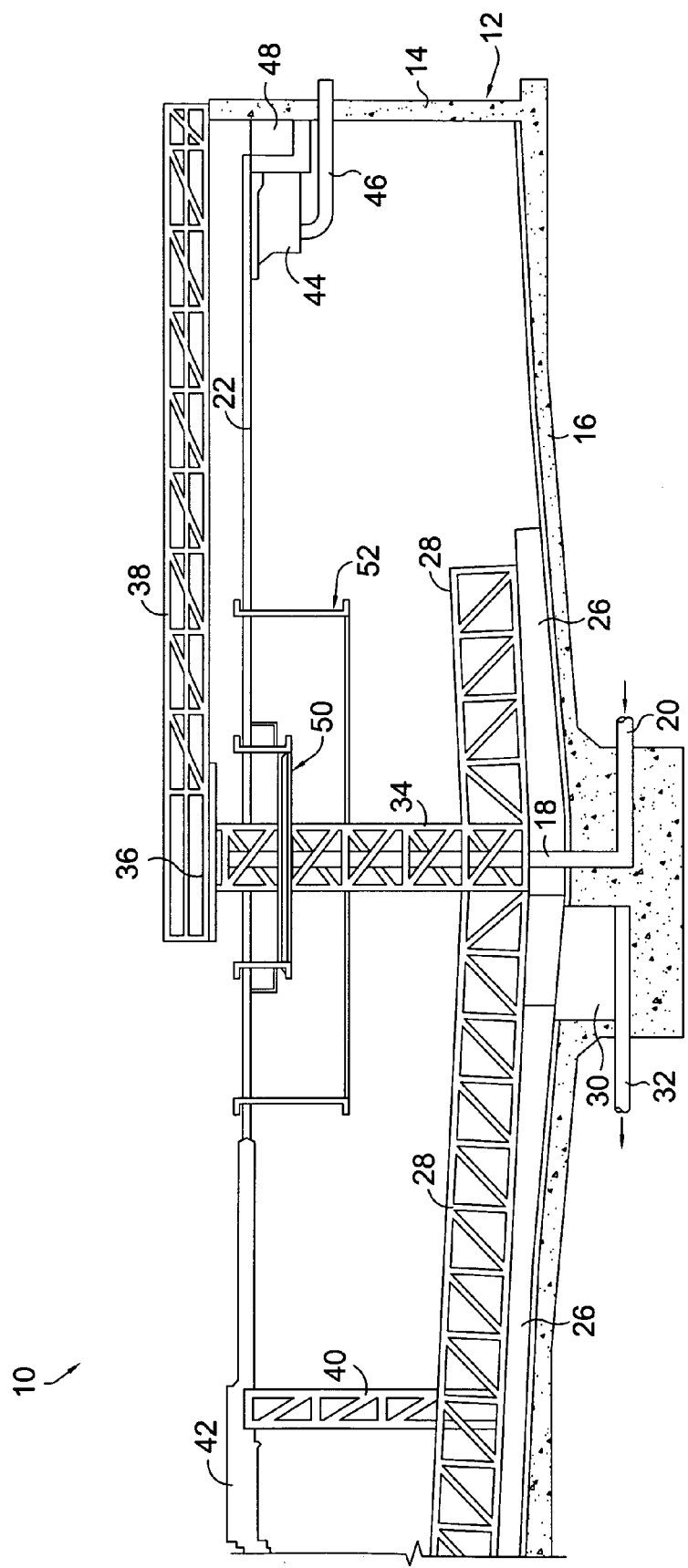
FIG. 1 is a fragmentary sectional view of a clarifier equipped with an improved inlet structure constructed according to a preferred embodiment of the present invention.
Figure 2:
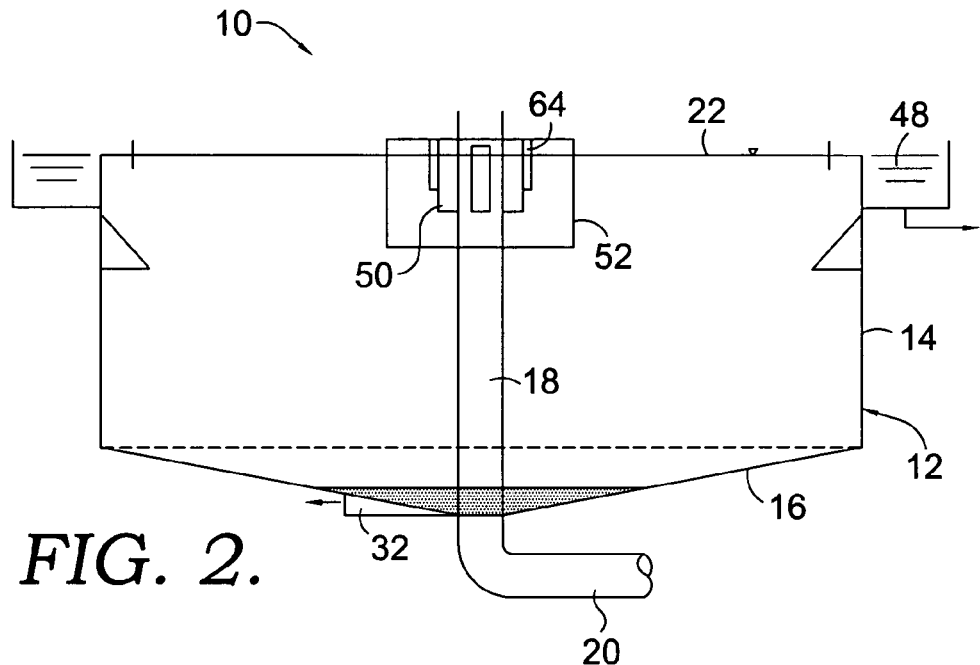
FIG. 2 is a fragmentary diagrammatic view of the clarification basin of FIG. 1, with some components deleted and some features shown diagrammatically for simplicity.

Referring now to the drawings in more detail and initially to FIG. 1, numeral 10 generally designates a clarifier which may be constructed conventionally for the most part. The clarifier 10 includes a clarifier basin 12 which receives influent liquid that is to be treated by removing solids. The clarifier basin 12 has a cylindrical sidewall 14 and a floor 16 which slopes downwardly toward the center. A vertical influent column 18 extends upwardly along the axial center of the basin 12. The influent that is to be treated is supplied to the influent column through an inlet pipe 20 which may extend under the floor 16. Below the liquid level 22 in the basin 12, the influent column 18 is provided with a plurality of ports 24 (see FIG. 5) which discharge the influent from the column 18.

The clarifier 10 is equipped with a plurality of rakes or blades 26 that are carried on rotating rake arms 28. As the arms 28 rotate, the blades 26 rake sludge which settles on the clarifier floor 16 toward a sludge sump 30 located near the center of the floor. The settled sludge may be removed from the sump 30 by pumping it through a sludge pipe 32.

The arms 28 are mounted on the lower end of a vertical cage 34 which extends upwardly around the center influent column 18. A drive mechanism 36 is connected with the top of the cage 34 and may operate conventionally to rotate the cage and the arms 28 and blades 26. A walkway 38 may be provided to extend from the clarifier wall 14 to the area of the top of the cage 14 at the center of the clarification basin.

A vertical truss 40 extending upwardly from one of the arms 28 may carry a scum skimmer 42 which is used to skim any scum that may be present on the surface of the liquid in the basin into a scum box 44 located near the wall 14. The material that collects in the box 44 may be discharged through a conduit 46. The clarified liquid is received in an effluent launder 48 which may be located adjacent to the clarifier wall 14. The effluent that enters the launder 48 is suitably discharged from the clarifier for further handling.

In accordance with a preferred embodiment of the present invention, the clarifier 10 is equipped with an improved inlet structure which is generally identified by numeral 50. The inlet structure 50 may be suitably mounted near the top center portion of the basin 12 to extend around the top of the influent column 18. A feedwell 52 is mounted in the basin 12 at a location to surround the inlet structure 50. The feedwell 52 may take the form of a cylindrical band which is open at the bottom so that the influent can discharge through the bottom of the feedwell into the clarification zone presented within the basin 12.

Figure 3:
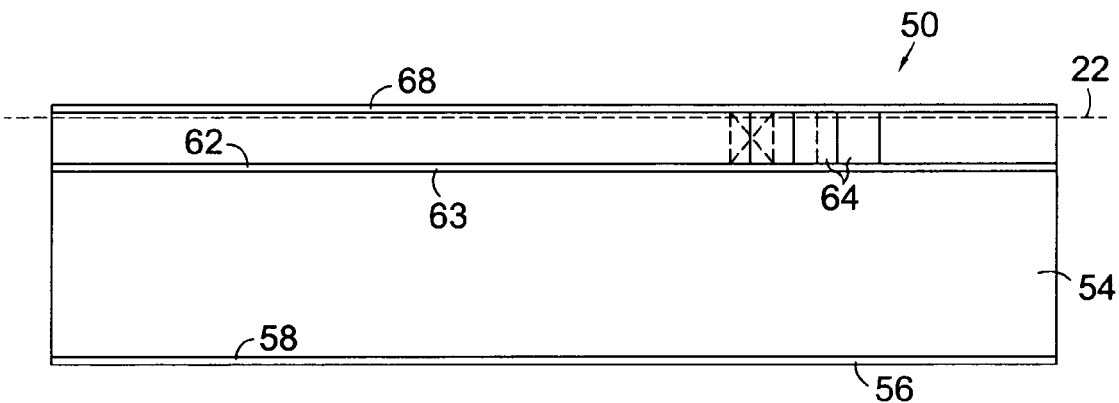
FIG. 3 is an elevational view on an enlarged scale of an inlet structure constructed in accordance with a preferred embodiment of the invention.
Figure 4:
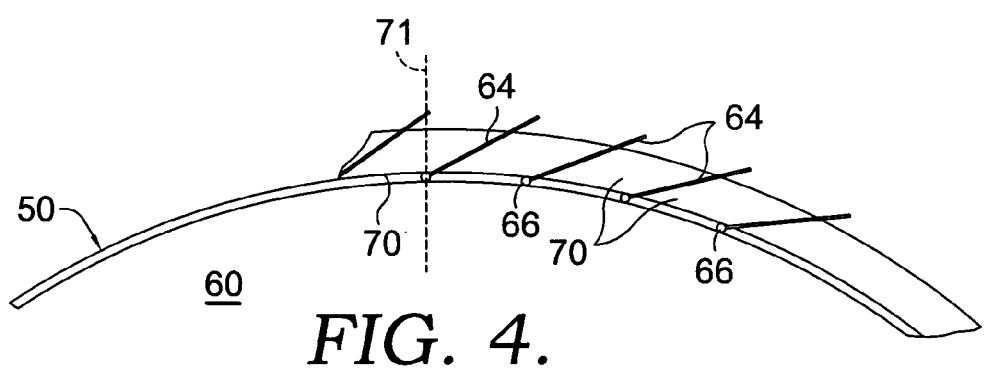
FIG. 4 is a fragmentary top plan view on an enlarged scale of the improved inlet structure.

With additional reference to FIGS. 3 and 4 in particular, the inlet structure 50 includes a cylindrical wall 54 which is closed at the bottom by a flat circular floor 56. An angle support 58 may be provided at the junction between the lower edge of the wall 54 and the floor 56. A chamber 60 (FIG. 4) is thus provided within the wall 54 and above the floor 56 of the inlet structure 50.

The wall 54 has an upper circumferential edge 62 which may be reinforced by an angle 63. As will be explained more fully, substantially the entire area immediately above the edge 62 is used for discharging influent from the chamber 60 into the feedwell 52.

A plurality of guide vanes 64 are provided on top of the edge 62 to direct the discharge flow that passes over the top of the inlet structure 50. Each vane 64 may be mounted on a vertical bar 66 (FIG. 4). The bars 66 are spaced apart from one another equidistantly and extend from the angle 64 upwardly to connection with another circular angle 68 located on top of the inlet structure 50. The vanes 64 are spaced apart along the entire circumference of the inlet structure 50.

As shown in FIG. 4, the vanes 64 extend outwardly from the bars 66 and may take the form of flat plates, with each plate being angled relative to a tangent to the edge 62. Between adjacent vanes 64, outlets 70 are provided for the inlet structure 50. The vanes 64 are angled to provide a tangential flow pattern for the flow passing through the outlets 70 and between the angled vanes 64. Each vane 64 is preferably oriented at an angle of between about 20° and about 45° relative to a tangent line to the edge 62. More specifically, it has been found that an angle of approximately 30° relative to a tangent line to the edge 62 is optimal in most applications.

The vanes 64 have lengths to assure that adjacent vanes overlap one another along a line (such as the line identified by numeral 71 in FIG. 4) that is coincident or coaxial with a radius line of the inlet structure 50. This assures that the flow through the outlets 70 cannot discharge radially but instead is directed tangentially by the guide vanes 64. Additionally, it is preferred that the outlets 70 occupy about 70% to about 95% of the circumference of the edge 62 so that nearly all of the circumference is used for the over-the-top discharge flow from the inlet structure 50.

As an alternative to the flat vanes 64, curved or scooped shaped vanes may be employed in order to guide the over-the-top discharge flow from the inlet structure 50 in a tangential flow pattern.

With reference to FIGS. 5 and 6 in particular, the ports 24 in the influent column 18 are located adjacent to the water level 22 and may extend slightly above the maximum water level. The ports may take the form of rectangular openings, although other configurations are possible. Typically, four of the ports are provided at equally spaced locations around the circumference of the column 18, although the number of ports can be varied, as can their locations and sizes.

Each port 24 may be baffled. One manner of baffling the ports 24 is to provide deflector plates 72 in alignment with the ports and spaced outwardly from them. The deflector plates 72 may be mounted directly to the influent column 18 by welding 74. Alternatively, the deflector plates may be mounted on the cage 34 if there is insufficient clearance between the cage and the influent column. In any case, the deflector plates 72 preferably curve in conformity with the curvature of the influent column 18, and the plates are spaced outwardly from the ports. The plates 72 may be spaced outwardly from the influent column a distance of 11 inches, for example.

As an alternative to baffling the influent flow with deflector plates, the wall 54 of the inlet structure 50 may be used for baffling. In this case, the ports 24 are preferably located below the edge 62 such that the flow discharging through the ports encounters the wall 54, with the wall 54 thus having a baffling effect to reduce the energy and velocity of the influent flow before it reaches the outlets 70.

FIG. 7 depicts an alternative manner of baffling which makes use of the inside surface of the inlet wall 54. In this arrangement, the inlet structure 50 is typically smaller in diameter and deeper than in the case of other inlet configurations. The influent column 18 shown in FIG. 7 may be provided with an upper set of ports 76 and a separate lower set of ports 78. Each of the ports 76 and 78 may be rectangular, with the long sides of the upper ports 76 being generally horizontal and the long sides of the lower ports 78 being generally vertical. There may be four of the upper ports 76 and four of the lower ports 78 arranged equidistantly around the influent column 18, although other arrangements are possible. Each of the lower ports 78 is entirely located below the edge 62 of the inlet structure 50. Each of the upper ports 76 is located near or adjacent to the liquid surface 22. In order to provide most of the flow at a location below the level of the outlets 70, the ports 78 should collectively occupy approximately 85% to 95% of the total area occupied by the upper ports 76 and the lower ports 78 combined.

A lip 80 (FIG. 7) may be provided on the inlet structure 50 in a manner to extend inwardly beneath each of the outlets 70. The lips 80 serve a baffling function to redirect the center column outlet flow toward the center and prevent unbalanced flows from being discharged from the inlet structure 50 (see the directional arrows 82 in FIG. 7).

FIG. 8 shows a modified feedwell 152 that may include a frusto-conical wall 154 that tapers from its lower edge 156 to its upper edge 158. The area within the lower edge 156 is preferably about 120% to about 175% larger than the area within the upper edge 158. The upper edge 158 is located near the surface of the liquid, while the lower edge 156 may be submerged to a depth of about 2.5 feet to about 3 feet.

In operation, the influent enters the pipe 20 and flows upwardly in the influent column 18. The influent discharges from the center column 18 through the ports 24, with the deflectors 72 acting as baffles that decrease the velocity of the influent liquid and change its direction by approximately 90° such that the flows from the different ports 24 tend to intermix. A typical velocity reduction is from about 1.5 feet per second to about 1.0 feet per second. In the case of the arrangement shown in FIG. 7, the majority of the influent discharges from the influent column 18 through the lower ports 78 which are aligned with the inlet structure wall 54 at a location below the outlets 70 such that the wall 54 provides a similar baffling function.

The influent that enters the closed bottom inlet structure 50 is discharged into the feedwell 52 through the outlets 70. Because substantially the entirety of the region above the edge 62 forms an outlet for the influent, the flow into the feedwell is uniform around the circumference of the inlet structure 50, and concentrated streams of flow are virtually eliminated. Additionally, the flow into the feedwell is reduced in energy due to the over-the-top discharge and the presence of the guide vanes 64 which direct the flow in a tangential flow pattern that is beneficial to flocculation of the suspended solids in the influent.

The influent flow that is discharged into the feedwell enters the clarification zone through the open bottom of the feedwell, and the suspended solids in the influent settle onto the clarifier floor 16. The sludge that builds up on the floor 16 is conveyed into the sump 30 by the rake arms 28 and blades 26. The sludge is removed from the sump 30 by pumping it through the sludge pipe 32 and may be recycled in whole or in part or disposed of as desired.

In the case of the conical feedwell 152 shown in FIG. 8, the tangential flow from the inlet structure 50 is received within the feedwell. The flow along the inclined wall 154 results in a decrease of the flow velocity that is proportional to the increase in the area presented within the wall as the liquid moves downwardly and outwardly. The vertical velocity can be reduced by an amount that is typically about 41%, and the horizontal velocity can be reduced by a value of about 25% typically. Additionally, the continued momentum of the generally circular flow results in a continued outward motion outside of the feedwell that increases the horizontal flow outwardly. This is beneficial in that it tends to counteract what is normally a tendency for the flow in the upper liquid levels of the clarifier basin to move inwardly toward the feedwell. As a result, there is enhanced flocculation and increased flocculation volume, a reduced loss of clarifier volume caused by inward flow, and a uniform low energy discharge from the feedwell.

Thus, there is a stepwise reduction in the energy level of the flow. First, the flow from the influent column 18 through the ports 74 (or 76 and 78) is baffled in order to reduce the energy level of the flow in a first energy reduction stage. Next, there is a reduction in the energy level and velocity of the flow through the outlets 70 of the inlet structure 50 in a second energy reduction stage. Finally, there is a third reduction in the energy level of the flow downwardly within the feedwell in a third energy reduction stage. By properly constructing the various components and arranging them in proper relationships with one another, each of these three energy reduction stages can easily effect a reduction in the energy level of the flow of at least 20%. A reduction at each of these stages of at least 40% can also be achieved. Most preferably, the overall reduction in the energy level of the flow in the first and second stages collectively may be at least 65%. These reductions in the energy level in different stages is highly beneficial to the performance of the clarifier. Additionally, by discharging the flow uniformly from the inlet structure 50 into the feedwell, localized imbalances and non-uniformities in the flow are avoided, and this has a beneficial effect on the clarifier performance. At the same time, the feedwell can be located at a relatively shallow depth in the clarifier basin in order to avoid high velocity discharge from the feedwell and disruption of the sludge blanket that builds up on the clarifier floor.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

The invention claimed is:

1. In a clarifier having an influent column provided with ports for discharging influent liquid from the column, the improvement comprising:
   an inlet structure having a generally cylindrical wall closed at the bottom to present a chamber for receiving liquid discharging from the ports, said wall having a circumferential edge above which a discharge space is presented for discharging liquid from said chamber over said edge around substantially the entire circumference of said wall;
   a feedwell in the clarifier extending around said wall outwardly thereof for receiving the influent discharged from said chamber; and
   a plurality of deflectors spaced outwardly from the influent column in alignment with said ports for baffling the liquid flow through said ports.

2. In a clarifier having an influent column provided with ports for discharging influent liquid from the column, the improvement comprising:
   an inlet structure having a generally cylindrical wall closed at the bottom to present a chamber for receiving liquid discharging from the ports, said wall having a circumferential edge above which a discharge space is presented for discharging liquid from said chamber over said edge around substantially the entire circumference of said wall;
   a feedwell in the clarifier extending around said wall outwardly thereof for receiving the influent discharged from said chamber;
   wherein said ports include an upper set of ports adjacent to a surface of the liquid in the clarifier; and
   wherein said ports include a lower set of ports below said upper set of ports and below said edge, said lower set of ports collectively occupying approximately 85% to 95% of the total area occupied by all of said ports.

3. The improvement of claim 2, including a lip underlying said discharge space for baffling the influent liquid discharging from said column.

4. A clarifier for clarification of influent liquid, comprising:
   a clarifier basin for settling of solids from the liquid;
   an influent column in said basin having a plurality of ports for discharging liquid from said column;
   an inlet structure having a generally cylindrical wall extending around said column and closed at the bottom to provide a chamber for receiving liquid from said ports, said wall having a circumferential edge;
   a plurality of guide vanes set on said edge spaced apart to present outlets from said chamber between the vanes and above said edge, said vanes being arranged to direct the liquid passing through said outlets in a generally circumferential flow pattern;
   said outlets collectively occupying at least about 70% of the circumference of said edge; and
   and open-bottom feedwell in said basin spaced outwardly from said inlet structure and projecting below the level of said edge;
   wherein said ports include an upper set of ports adjacent to a surface of the liquid in the clarifier; and
   wherein said ports include a lower set of ports below said upper sets of ports and below said edge, said lower set of ports collectively occupying approximately 85% to 95% of the total area occupied by all of said ports.

5. A clarifier as set forth in claim 4, including a lip underlying each of said outlets for baffling the liquid discharging from said influent column.

6. In a clarifier having an influent column provided with ports for discharging influent liquid from the column, the improvement comprising:
   an inlet structure having a generally cylindrical wall closed at the bottom to present a chamber for receiving liquid discharging from the ports, said wall having a circumferential edge above which a discharge space is presented for discharging liquid from said chamber over said edge around substantially the entire circumference of said wall;
   a feedwell in the clarifier extending around said wall outwardly thereof for receiving the influent discharged from said chamber;
   a plurality of guide vanes mounted on said inlet structure adjacent said edge, said vanes being angled to effect a generally tangential flow of liquid passing through said discharge space, said vanes being angled in the range of approximately 20° to 45° relative to a tangent to said edge; and
   a plurality of deflectors spaced outwardly from the influent column in alignment with said ports for baffling the liquid flow through said ports.

7. In a clarifier having an influent column provided with ports for discharging influent liquid from the column, the improvement comprising:
- an inlet structure having a generally cylindrical wall closed at the bottom to present a chamber for receiving liquid discharging from the ports, said wall having a circumferential edge above which a discharge space is presented for discharging liquid from said chamber over said edge around substantially the entire circumference of said wall;
- a feedwell in the clarifier extending around said wall outwardly thereof for receiving the influent discharged from said chamber;
- a plurality of guide vanes mounted on said inlet structure adjacent said edge, said vanes being angled to effect a generally tangential flow of liquid passing through said discharge space, said vanes being angled in the range of approximately 20° to 45° relative to a tangent to said edge, wherein said ports include an upper set of ports adjacent to a surface of the liquid in the clarifier and a lower set of ports below said edge, said lower set of ports collectively occupying between approximately 70% to 95% of the circumference of said edge.

8. In a clarifier having an influent column provided with ports for discharging influent liquid from the column, the improvement comprising:
- an inlet structure having a generally cylindrical wall closed at the bottom to present a chamber for receiving liquid discharging from the ports, said wall having a circumferential edge above which a discharge space is presented for discharging liquid from said chamber over said edge around substantially the entire circumference of said wall;
- a feedwell in the clarifier extending around said wall outwardly thereof for receiving the influent discharged from said chamber;
- a plurality of guide vanes mounted on said inlet structure adjacent said edge, said vanes being angled to effect a generally tangential flow of liquid passing through said discharge space, said vanes being angled in the range of approximately 20° to 45° relative to a tangent to said edge; and
- said ports including an upper set of ports adjacent to a surface of the liquid in the clarifier and a lower set of ports below said upper set of ports and below said edge, said lower set of ports collectively occupying approximately 85% to 95% of the total area occupied by all of said ports.

9. The improvement of claim 8, including means for baffling the liquid flow discharging through said ports.

10. The improvement of claim 8, wherein said ports are located below said edge to utilize the surface of said wall for baffling of the liquid flow discharging through said ports.

11. The improvement of claim 8, wherein adjacent vanes overlap one another along a line coincident with a radius line of said edge.

12. The improvement of claim 8, wherein said discharge space defines separate outlets from the inlet structure located between adjacent vanes and collectively occupying between approximately 70% to 95% of the circumference of said edge.

13. The improvement of claim 8, wherein said feedwell has a bottom located about 1.5 feet to 3 feet below said edge.

14. The improvement of claim 8, including a lip underlying said discharge space for baffling the influent liquid discharging from said column.

15. The improvement of claim 8, wherein:
- said feedwell has a frusto-conical configuration tapering from a lower edge thereof to an upper edge thereof; and
- said feedwell defines within said lower edge thereof an area that is between about 120% and about 175% greater than an area defined within said upper edge of the feedwell.

* * * * *